(12) United States Patent
Futagami et al.

(10) Patent No.: US 6,299,424 B1
(45) Date of Patent: Oct. 9, 2001

(54) SLIDING MEMBER AND REFRIGERATING COMPRESSOR USING THE SAME

(75) Inventors: Yoshiyuki Futagami; Hideo Hirano, both of Kusatsu; Hideto Oka, Shiga; Masahiro Tsubokawa, Kusatsu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/486,877

(22) Filed: Apr. 11, 2000

(30) Foreign Application Priority Data

Sep. 18, 1997 (JP) ...................................... 9-25346
Jul. 24, 1998 (JP) ................................. 10-209013

(51) Int. Cl.[7] ...................................... F03C 2/00
(52) U.S. Cl. ..................... 418/55.2; 418/63; 418/179; 75/230; 75/236; 384/279; 384/902
(58) Field of Search ............... 418/55.2, 63, 179; 75/230, 236; 384/279, 902

(56) References Cited

U.S. PATENT DOCUMENTS

| | | | |
|---|---|---|---|
| Re. 36,405 | * 11/1999 | Akita et al. ........................ | 384/902 |
| Re. 36,604 | * 3/2000 | Sano et al. ........................ | 418/55.1 |
| 4,491,477 | * 1/1985 | Suganuma et al. ................. | 75/230 |
| 4,526,617 | * 7/1985 | Hiraoka et al. .................... | 75/236 |
| 4,556,533 | * 12/1985 | Oaku et al. ........................ | 419/11 |
| 4,702,683 | * 10/1987 | Inaba et al. ........................ | 418/57 |
| 4,776,885 | * 10/1988 | Nakagawa et al. ................. | 384/279 |
| 5,178,527 | * 1/1993 | Jung ................................. | 418/55.6 |
| 5,222,881 | * 6/1993 | Sano et al. ........................ | 418/55.1 |
| 5,490,730 | * 2/1996 | Akita et al. ........................ | 384/279 |
| 5,704,216 | * 1/1998 | Hirano et al. ..................... | 62/114 |
| 5,865,607 | * 2/1999 | Fukuoka ............................. | 418/46 |
| 5,950,451 | * 9/1999 | Kim .................................. | 62/469 |
| 6,086,257 | * 7/2000 | Lee ................................... | 384/279 |

FOREIGN PATENT DOCUMENTS

| | | | |
|---|---|---|---|
| 09 032770 | 2/1974 | (JP) . | |
| 54 013005 | 1/1979 | (JP) . | |
| 54-20911 | 2/1979 | (JP) . | |
| 54-62108 | 5/1979 | (JP) . | |
| 2-27666 | 2/1990 | (JP) . | |
| 03 162559 | 7/1991 | (JP) . | |
| 05033093 | 2/1993 | (JP) . | |
| 5-71489 | 3/1993 | (JP) . | |
| 08-261187-A1 | * 10/1996 | (JP) ................................. | 418/55.1 |
| 09 032753 | 2/1997 | (JP) . | |

* cited by examiner

Primary Examiner—Thomas Denion
Assistant Examiner—Theresa Trieu
(74) Attorney, Agent, or Firm—Jordan and Hamburg LLP (57) ABSTRACT

When sliding elements, slide bushings, vanes and Oldham rings employed in various types of refrigeration compressors and other applications meet the following conditions, they resist sticking to aluminum-base components, resist depletion of the oil film on slide faces, and exhibit excellent wear resistance. Firstly, the elements must comprise an iron-base sinter having closed cells on at least the slide face. Secondly, in order for the oil film to be maintained on the slide face by the closed cells and to enhance lubricating properties, the proportion of closed cells having circular-equivalent diameter of 10 $\mu$m or less, i.e. the number of $\leq 10$ $\mu$m cells/total number of cells, must equal 85% or more, and the opening area of the closed cells on the slide face must equal 5% or less. Finally, the sliding element density must be 7.3 g/cm$^3$ or higher.

22 Claims, 8 Drawing Sheets

SLIDING MEMBER AND REFRIGERATING COMPRESSOR USING THE SAME

BACKGROUND

The present invention relates to a refrigeration compressor for use in air conditioning systems for commercial or non-commercial use.

Electric compressors used in air conditioning include those in which the compressor section comprises a reciprocating type, rotary type, or scroll type. These designs are employed in both household and commercial air conditioning equipment. The particular advantages of the various designs in terms of cost and performance are utilized in a growing market.

Regardless of the design, the compressor mechanism and the drive mechanism include sliding elements. Wear and seizing of these sliding elements has significant impact on the service life of the refrigeration compressor. Specific examples of sliding elements having particularly great effect on refrigeration compressor service life are the slide bushing provided between the orbiting scroll of the compressor mechanism and the crankshaft that transmits the rotation of the motor to the orbiting scroll; the Oldham ring used to support the orbiting scroll such that the latter undergoes orbital motion without rotating with respect to the stationary scroll; and a vane, provided to the cylinder, which is in sliding contact with the inside wall of the cylinder and in sliding contact with the eccentrically rotating piston, engaging in follower motion therewith. In the prior art, these sliding elements are fabricated from iron-base sinters in order to improve lubricant retention, and are subjected to quench hardening in order to raise the hardness and improve wear resistance.

Compressors of the prior art, which employ chlorinated refrigerants such as designated CFC R12 and designated CFC R22, exhibit lubricating action produced by the extreme pressure effect of the chlorine contained in the refrigerant, and thus the slide bushing, Oldham ring, and vane present no particular problems in terms of service life, even when used in maintenance-free refrigeration compressors.

It has recently been confirmed that the chlorine atoms contained in the molecules of the designated CFCs damage the ozone layer. The development and use of substitute refrigerants is being planned.

The HFCs (hydrofluorocarbons), which contain no chlorine, are highly serviceable substitutes "Hydraulic Technology '94.6" (published by Nippon Kogyo Shuppan).

However, the fact that these substitute refrigerants contain no chlorine means that the same level of lubricating provided by the conventional designated CFCs cannot be expected. Accordingly, sliding conditions will be more severe, and as long as sliding mechanism design remains unmodified, service life will be shortened. Specifically, wear and seizing of the slide bushing, Oldham ring, and vane will occur. Causes of early wear and early seizing are thought to lie in susceptibility to a critical lubrication state in which portions of the oil film are depleted, due to the inability of the substitute refrigerants to provide lubricating action on par with that of the designated CFCs.

Even where slide bushings, Oldham rings, and vanes are oil-retaining, comprising porous materials produced from sintered metals such as sintered iron containing added Mo and Ni, as taught in Unexamined Patent Application (Kokai) 9-32770, experiments conducted by the inventors indicate minimal improvement in wear resistance when used in conjunction with the substitute refrigerants. Extensive research involving repeated experimentation indicated the following with respect to this point. Firstly, wear resistance is a particular problem at sliding surfaces on which pressure and load are brought to bear; secondly, a possible reason therefor is that the lubricant supplied to the sliding surfaces is induced to penetrate deeply into or is extracted from the cells of the sintered metal due to the action of pressure and load, resulting in early onset of oil film depletion on the sliding surfaces.

In order to examine this point, the inventors of the present invention used a mercury penetration method to conduct a so-called "cell examination" of the cells in sintered metal materials. The test specimens of the prior art used in the tests were an iron-base sintered elements having the composition C: 0.1–1.0 wt %, Cu: 0.5–3.0 wt %, Ni: 1.0–7.0 wt %, Mo: 0.1–1.5 wt %, and subjected to quench hardening. The examination was conducted by ascertaining the amount of mercury penetrating into one gram of the sample material; the penetrating amount corresponds to the total cell volume of the sample. Results are presented in Table 1; total cell volume was 0.0118 cc/g, as ascertained through the corresponding amount of penetrating mercury.

| | Cell | Density | Total Cell Volume |
|---|---|---|---|
| Prior Art Specimens | 40–50 μm | 7.0 g/cm³ | 0.0118 cc/g |

The prior art specimens exhibited density on the order of 7.0 g/cm³, slightly higher than the usual density of 6.8 g/cm³ seen in sintered bearings. Various examinations concerning cell condition in the prior art specimens revealed a structure like that modeled in FIG. 3(b). The areas painted out in black are openings a1 to the surface; wide cells a having these openings a1 were present intermittently over the surfaces of the specimens. The size of the wide cells a ranged from 40 μm–50 μm, and these cells were in communication via narrow connecting segments a2 with other cells a having openings on the surface and with other wide cells a without openings on the surface that were interspersed throughout the specimen.

Accordingly, the cells present in the prior art specimens may be accurately termed "open cell". This is consistent with the findings in the examinations that the amount of penetrating mercury is considerable. It is also consistent with the idea that under conditions of pressure and load, large amounts of lubricant penetrate into the surfaces of compressor slide bushings, Oldham rings, vanes, and other sliding elements, causing the oil film to become depleted.

The aforementioned Unexamined Patent Application (Kokai) 9-32770 teaches impregnation of the cells of the sintered iron with a resin in order to prevent the lubricant from escaping into the cells under high loading, which makes it harder for an oil film to form. However, the advantages associated with the lubricant being retained in the cells are lost with this method, and the resin impregnation method entails increased costs.

Unexamined Patent Application (Kokai) 5-33093 teaches the following. Iron-base sintered metals contain residual porosity of 10–20%, but nonetheless possess adequate strength through metal bonding and diffuse bonding among powder grains; the materials also have an oil retaining action whereby the lubricant is retained in the residual cells, so that an oil film forms on mated slide faces during sliding. Exceptional wear resistance and sliding characteristics are thus provided under wet lubrication conditions. However, increased weight is a drawback. A substitute that provides the required strength while retaining wear resistance and sliding characteristics is a quench hardened aluminum alloy powder which is hot cast at a temperature such that the metastable alloy phases of the material are not damaged, and then formed and heat treated to produce a material containing 2–5% 10 $\mu$m residual individual cells. The Fe and Ni contained therein form intermetallic compounds with the Al, enhancing high-temperature strength, while the Cu, Mg, and Mn contribute to improved strength, hardness, and other mechanical properties. The residual cells produce an oil retaining action under a wet environment, thereby preventing parts from seizing. Since the residual cells comprise fine closed cells, the material readily withstands stress and resists deterioration at grain boundaries due to penetration by oxidizing atmospheres.

However, sliding elements fabricated from the aluminum alloy powder materials described above cannot be used for the crankshaft that transmits the rotation of the motor to the orbiting scroll of the compressor mechanism, or for the Oldham ring and slide bushing provided between the crankshaft and the orbiting scroll. The reason is that where the sliding elements are fabricated from aluminum alloy powder materials, there is a tendency to experience sticking with the orbiting scroll, which also consists of aluminum-base material. Another reason is that sliding elements constructed from aluminum alloy powder materials tend to have inferior strength to iron-base materials, particularly in the case of small elements like Oldham rings.

Unexamined Patent Application (Kokai) 3-162559 teaches a sliding element consisting of an iron-base material, the surfaces of which are provided with a porous oxide layer, a solid lubricant being retained within this porous oxide layer. Since only the cells of the porous layer are open cell, the problems mentioned earlier are not solved. Experiments conducted by the inventors indicate that the oil film sustaining force achieved with open cells is rather low, at most 100 kgf, as indicated by the black markings in FIG. 7.

Sealing the cells with the solid lubricant does not bring about complete sealing, and thus the open cell morphology is not eliminated, leaving the aforementioned problems unsolved. The sealing treatment also entails increased costs. Another drawback is wearing away of the oxide layer when a maintenance free machine is operated for extended periods or under harsh conditions, resulting in a loss of reliability. The high process temperatures used in oxynitriding of thin films result in deformation of the elements, so that the required precision is not achieved. Accordingly, such methods are unsuitable for Oldham rings.

Unexamined Patent Application (Kokai) 54-13005 teaches the following with regard to metal sinter vanes. The gas-tightness of sinter vanes is improved by sealing residual cells in metal oxides and matrices containing dispersed metal oxides created through water vapor treatment. However, the cells are not completely sealed by the water vapor treatment, so escape of lubricant due to the open cell nature of the open cells.

SUMMARY OF THE INVENTION

The following are objects of the present invention. Based on such novel discoveries, it provides a sliding element comprising an iron base and thus resisting sticking with other elements such as aluminum-base elements, resisting depletion of the oil film at sliding surfaces, and exhibiting excellent wear resistance, and an extended life refrigeration compressor employing this element.

The sliding element of the present invention has the following characterizing features. It has closed cells, the proportion of these closed cells with circular-equivalent diameter of 10 $\mu$or less (number of $\leq 10$ $\mu$m cells/total number of cells) equaling 85% or more, and the cell opening area on the slide face equal to 5% or less.

Through this design, the closed cells in the slide face of the sliding element can intake through the openings in the slide face thereof lubricants delivered to the sliding surface. Since the cells do not communicate with each other, the lubricant taken in to the closed cells is retained therein, the lubricant being delivered to the sliding surface in localized fashion so that an oil film is continuously sustained, thereby providing good lubricating qualities and improved resistance to seizing. Since the material comprises sintered iron, metal bonding affords strength superior to aluminum alloy powder sinters, despite the presence of cells. The material is therefore suitable for producing slide bushings and Oldham rings to be arranged between the orbiting scroll and the crankshaft for transmitting the rotation of the refrigeration compressor motor to the rotor. Where both the slide bushing and Oldham ring consist of iron-base materials, a hardness differential between mated sliding iron-base elements may be created in order to prevent sticking between the like metal elements. Where the mated sliding element is an aluminum-base orbiting scroll, the pair comprise different metals, so the problem of sticking between like metal is avoided, thereby increasing the degree of freedom in materials selection for mated elements. Since the proportion of closed cells having circular-equivalent diameter of 10 $\mu$m or less (number of $\leq 10$ $\mu$m cells/total number of cells) equals 85% or more, and the cell opening area on the slide face equals 5% or less, adequate lubrication is assured even under the most harsh sliding conditions, i.e., the use of chlorine-free HFC refrigerant hydrofluorocarbon refrigerants and HC hydrocarbon refrigerants, and resistance to seizing adequate to provide maintenance free operation is assured. Specifically, resistance to seizing equal to or greater than that with open cells in HFC refrigerant environments is assured. Ester oils are effective for use as the lubricant. Where circular-equivalent diameter of 10 $\mu$m or less is 95% or above, resistance to seizing equal to or greater than that with open cells in conventional HCFC refrigerant environments is assured.

This closed-cell iron-base sinter sliding element is produced by repeated sintering after pressing, and is a high quality product with stable cell conditions, including the case of iron-base systems. In preferred practice, density is 7.3 g/cm$^3$ or higher.

The refrigeration compressor which pertains to the present invention comprises a compressor mechanism, a drive device for driving this compressor mechanism, a crankshaft for transmitting the rotation of this drive device to the orbiting scroll of the compressor mechanism, and a slide bushing or/and an Oldham ring provided between the crankshaft and the orbiting scroll, and is characterized in that the orbiting scroll is aluminum-base, and the sliding element comprises an iron-base sinter with closed cells present on at least the slide face thereof. This characterizing feature ensures that lubricant delivered to the slide face is taken in by the closed cells, retained therein, and the lubricant supplied in localized fashion over the slide face, thereby continuously maintaining an oil film and providing reliable resistance to sticking. Since the element comprises sintered iron, the strength required of small components such as the slide bushing or/and Oldham ring is provided despite the presence of cells, as contrasted with aluminum alloy powder sinters.

Where the orbiting scroll which is the mated sliding element consists of a like iron-base material, a method such as creation of a hardness differential may be used to prevent sticking between the like metals. Where the mated sliding element is an aluminum-base orbiting scroll, the pair comprise different metals, so the problem of sticking between like metals is avoided, thereby increasing the degree of freedom in materials selection for the mated elements.

The slide bushing comprises a sliding element with closed cells, the proportion of these closed cells having circular-equivalent diameter of 10 $\mu$m or less (number of $\leq$10 $\mu$m cells/total number of cells) equaling 85% or more, and the cell opening area on the slide face equal to 5% or less. Thus, adequate lubrication is assured even under the most harsh sliding conditions, i.e., the use of chlorine-free HFC refrigerants, HC refrigerants, and other hydrofluorocarbon refrigerants, in conjunction with ester oil lubricants, and resistance to seizing adequate for maintenance free operation is assured. Adequate lubrication and resistance to seizing are achieved even when chlorine-free hydrofluorocarbons or hydrofluorocarbons are used, and the use of ester oils as lubricants presents no problems and is appropriate.

As disclosed above, where this sliding element is produced by repeated sintering after pressing, a high quality product with stable cell conditions results, and reliability of the apparatus is improved. In preferred practice, the density of the sliding element is 7.3 g/cm$^3$ or higher.

The refrigeration compressor of the present invention further comprises a vane, provided to the cylinder, which is in sliding contact with the inside wall of the cylinder and in sliding contact with the eccentrically rotating piston, engaging in follower motion therewith. Where the vane is characterized by comprising iron-base sinter sliding member with closed cells, the proportion of closed cells having circular-equivalent diameter of 10 $\mu$m or less (number of $\leq$10 $\mu$m cells/total number of cells) equaling 85% or more, and the cell opening area on the slide face equal to 5% or less, the action achieved is similar to that exhibited by the aforementioned sliding member in the lubricating environment and cell conditions thereof. Like the sliding member described above and for similar reasons, the vanes are produced by repeated sintering after pressing. In preferred practice, the density of the sliding element is 7.3 g/cm$^3$ or higher.

Other objects and features of the invention will become clear through the detailed description of the invention and the drawings provided below. The characterizing features of the present invention may be used insofar as possible alone, or combined in various combinations.

DETAILED DESCRIPTION OF THE INVENTION

Figure 1:
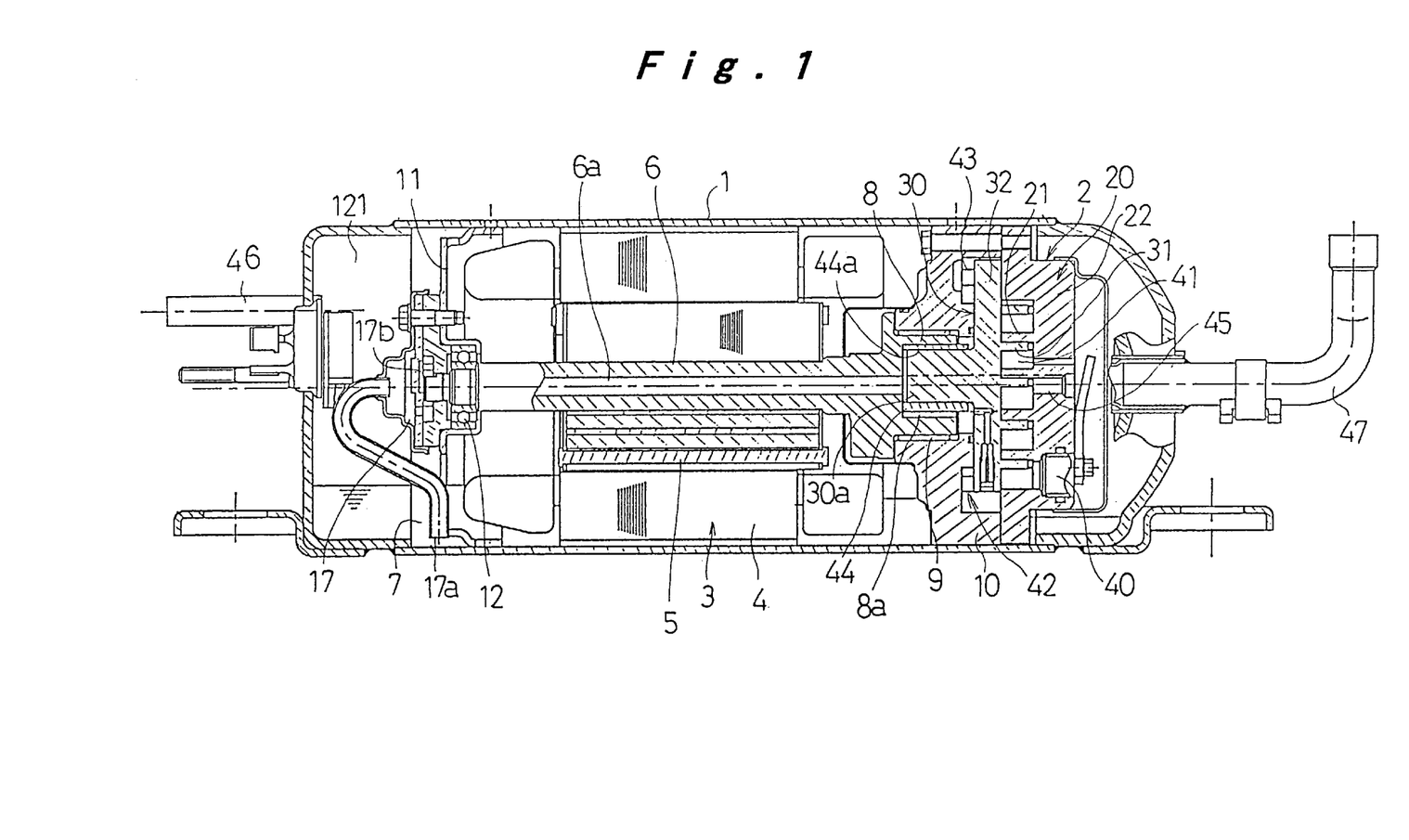
FIG. 1 is a longitudinal cross section of the scroll compressor of Embodiment 1 of the present invention.

Embodiment 1 is an example of a horizontal scroll compressor for use in air conditioning. Referring to FIG. 1, the overall design thereof comprises a compressor mechanism 2, provided to one end of the interior of a hermetic housing 1, for taking in, compressing, and discharging the refrigerant. The stator 4 of the drive mechanism 3 that drives the compressor mechanism 2 is arranged in the central portion of the hermetic housing 1 and secured to the inside face of the sidewall of the hermetic housing 1. The rotor 5 associated with the stator 4 of the drive mechanism 3 is linked to a crankshaft 6 comprising the motor shaft of the compressor mechanism 2, and is arranged such that the axis of rotation thereof is substantially on the horizontal. A main shaft 8 provided at the compressor mechanism 2 end of the crankshaft 6 is supported by a main shaft bearing member 10 secured to the compressor mechanism 2 by screwing it in place or the like, and the end opposite the main shaft 8 is supported by an auxiliary shaft bearing member 11 welded in place to the inside face of the wall of the hermetic housing 1 at the other end of the hermetic housing 1.

That portion of the main shaft bearing member 10 that supports the main shaft 8 and that portion of the auxiliary shaft bearing member 11 that supports the other end of the crankshaft 6 are provided with bearings 9 and 12. These bearings 9 and 12 support the rotation of the crankshaft 6, and also support the force generated by the crankshaft 6 when the compressor mechanism 2 compresses the refrigerant through this rotary motion.

The bottom section of the hermetic housing 1 on the opposite end from the main shaft bearing member 10 is provided with a lubricating oil reservoir 7, and the top section thereof has a refrigerant discharge passage 121 that leads to the outside of the hermetic housing 1. A lubricating oil pump 17 driven by the far end of the crankshaft 6 is provided to one face of the auxiliary shaft bearing member 11. The lubricating oil pump 17 supplies all of the sliding elements, including the bearing portions of the compressor mechanism 2, through with a lubricant bore 6a. The lubricant bore 6a opens into the lubricating oil reservoir 7 through an intake port 17a; a discharge port 17b extends longitudinally from the far end of the crankshaft 6 to the main shaft 8 portion.

Figure 2:
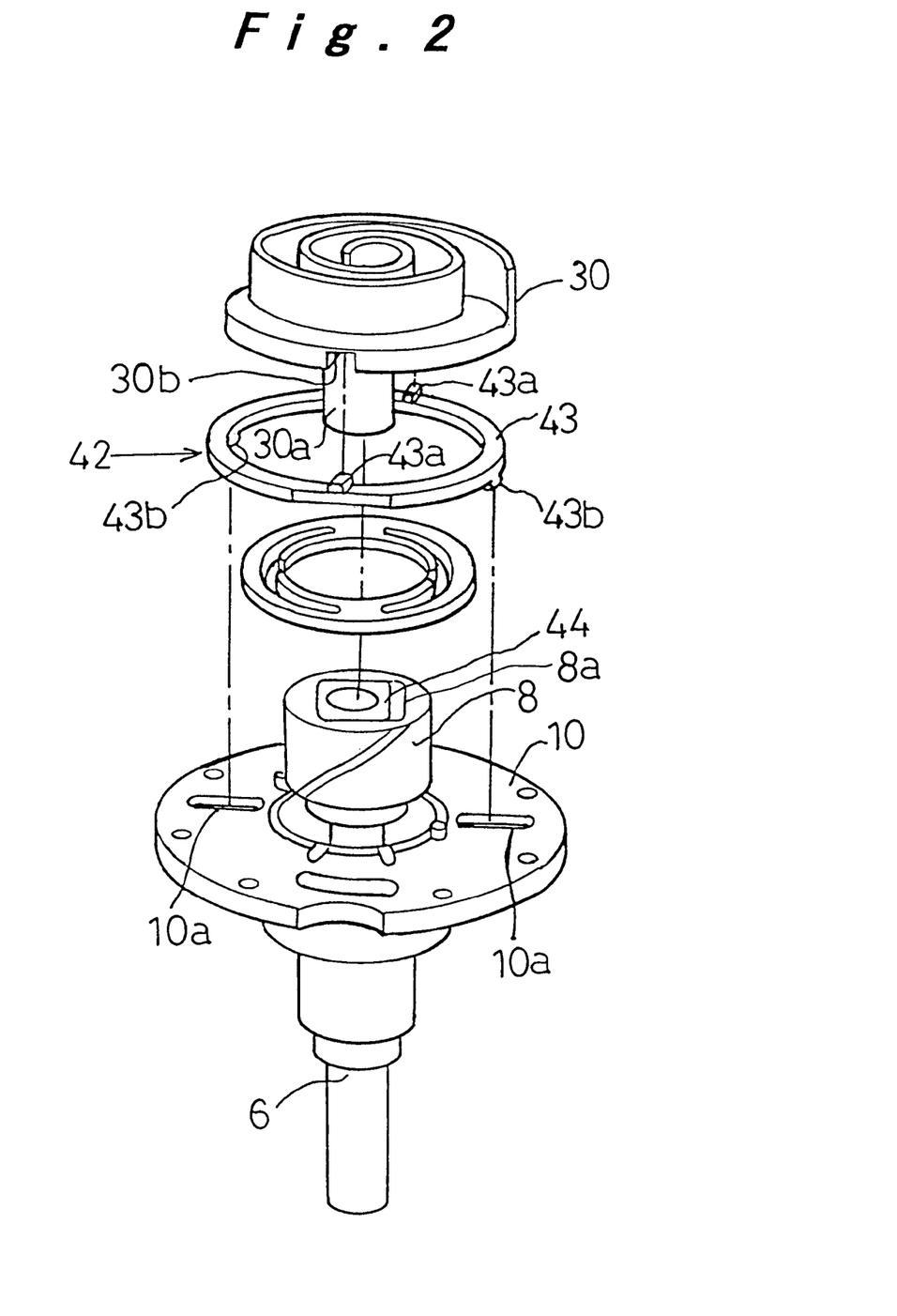
FIG. 2 is an exploded perspective view of principal elements of the compressor of FIG. 1.

Referring to FIGS. 1 and 2, the compressor mechanism 2 is designed such that the orbiting scroll 30 moves along a circular orbit with respect to the stationary scroll 20 without itself rotating. A spiral blade 21 meshes with the stationary scroll 20 that projects upward from a polished plate 22, and a blade 31 having a spiral shape substantially identical to that of the aforementioned blade meshes with the orbiting scroll 30 that 20 which projects upward from a polished plate 32, forming a plurality of compression chambers between the two.

The rotation-preventing orbital drive mechanism 42 is a mechanism for moving the orbiting scroll 30 along a circular orbit while preventing it from rotating. The design is such that the slide bushing 44 fits into a slide recess 8a provided to the main shaft 8 so as to slide across the diameter thereof. The bearing hole 44a thereof accommodates an orbital shaft 30a eccentrically arranged on the back face of the orbiting scroll 30 so as to be capable of rotation directly or through the agency of a bearing; between the main shaft bearing member 10 and the orbiting scroll 30 is provided an Oldham ring 43 that supports the orbiting scroll 30 as it orbits without rotating with respect to the stationary scroll 20. Referring to FIG. 2, the Oldham ring 43 has protuberances 43a at two locations along the diameter on the face facing the orbiting scroll 30 and protuberances 43b at two locations along the diameter on the face facing the main shaft bearing member 10. These two sets of protuberances are arranged at right angles to each other. The protuberances 43a and 43b may be integrally formed with the Oldham ring 43, or constituted as separate elements, allowing them to be replaced when damaged.

The protuberances 43a of the Oldham ring 43 fit into grooves 30b provided at two locations along the diameter of the orbiting scroll 30 and extending in the radial direction thereof, so that the Oldham ring 43 is supported capable of motion in the direction parallel to the protuberances 43a. The protuberances 43b fit into grooves 10a provided at two locations along the diameter of the stationary element 10 and extending in the radial direction thereof, so that the Oldham ring 43 is supported capable of motion in the direction parallel to the protuberances 43b. As the main shaft 8 rotates, the concerted motion of the Oldham ring 43 and the slide bushing 44 causes the orbiting scroll 30 to orbit without rotating with respect to the stationary scroll 20.

Orbital motion by the orbiting scroll 30 causes the compression chamber 41 formed between it and the stationary scroll 20 to orbit to the closed position from the open position at the outside edges of the polished plates 22 and 32, whereby the refrigerant is taken in through the intake port 40 depicted in FIG. 1. The refrigerant is then gradually compressed due to the gradually decreasing capacity of the compression chamber 41 in which the refrigerant has been adequately sealed. With continued revolution, the compression chamber 41 begins to communicate with the discharge port 45 as the capacity of the compression chamber 41 continues to decrease, expelling the compressed refrigerant through the discharge port 45. The expelled refrigerant is delivered from a discharge channel 121 formed by the hermetic housing 1 through a discharge pipe 46 to a refrigeration cycle connected to the outside of the hermetic housing 1, and is then returned into the hermetic housing 1 through an intake pipe 47, where the operation described above is repeated.

The scroll compressor of the present invention is not limited to the hermetic type or horizontal type described above, and may take any of various configurations such as an open type or vertical type. It has potential application in any system wherein a stationary scroll 20 and a orbiting scroll 30 mesh to form a compression chamber 41, having sliding elements such as a slide bushing 44 and an Oldham ring 43, and driven.

In refrigeration compressors of hermetic, maintenance-free configuration employing chlorine-free hydrofluorocarbon refrigerants, the refrigerant cannot be expected to provide lubrication, so sliding conditions are harsh. Where sliding components such as the aforementioned slide bushing 44 and Oldham ring 43 are used in such environments, durability will be a problem.

Continued extensive experimentation conducted by the inventors of the present invention on the basis of the discoveries described above resulted in the development of a sliding element that, like conventional elements, consists of an iron-base sintered material, but that allows the cells, which represent a problem in the prior art, to be constituted with reduced size and with a closed cell structure, making the sliding element suitable as a slide bushing 44 or an Oldham ring 43. The sliding element is iron-base and requires no special treatment, and can thus be produced at low cost.

This sliding element has the composition C: 0.1–1.0 wt %, Cu: 0.5–3.0 wt %, Ni: 1.0–7.0 wt %, Mo: 0.1–1.5 wt %. It is a quench hardened iron-base sinter, and when subjected to two iterations of the sintering process and the pressing process employed in the conventional procedure, affords an iron-base sinter having a cell structure wherein small closed cells 51 that are not interconnected are dispersed about, as modeled in FIG. 3(a). The closed cells 51 present on the surface of the sinter have openings 51a at the surface thereof. A cell examination by mercury penetration analogous to that conducted on the prior art test materials was conducted on this material. The results are presented in Table 2, below; the total cell volume was 0.0009 cc/g; mercury penetration was significantly reduced relative to the case of the prior art.

|  | Cell | Density | Total cell Volume |
| --- | --- | --- | --- |
| Test Material of This Example | Closed 10 μm | 7.3 g/cm$^3$ | 0.0009 cc/g |

Figure 3A:
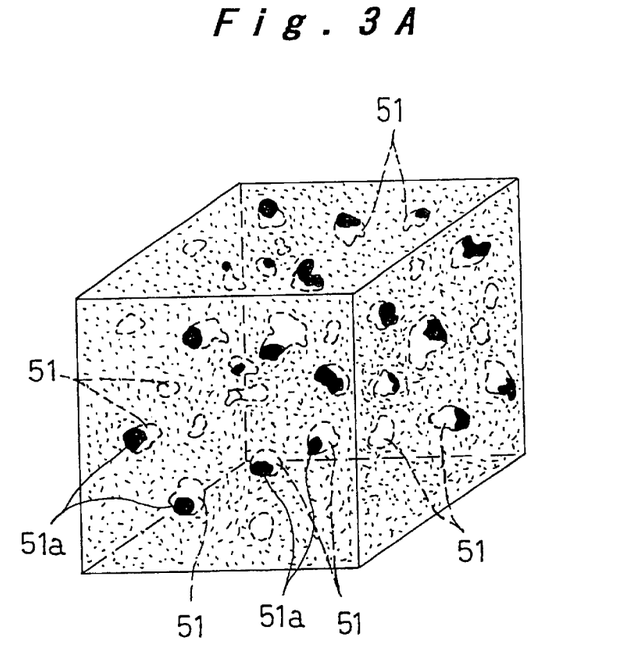
FIG. 3 shows model diagrams of cell morphology in the sinters which constitute the sliding members, (a) depicting the test material of Embodiment 1, and (b) depicting a test material of the prior art.
Figure 3B:
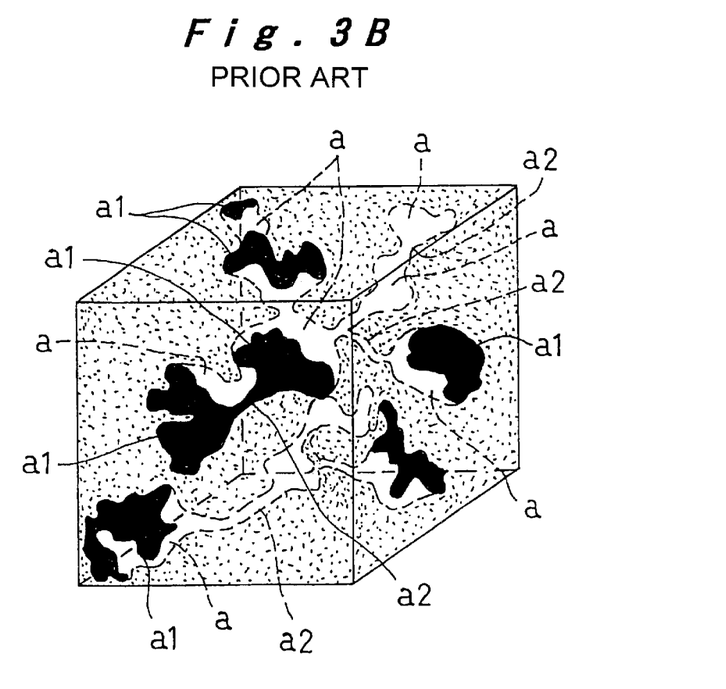

Total cell volume in this case reflects only closed cells 51 open at the surface of this test material into which the mercury penetrated. The density of this kind of test material is about 7.3 g/cm$^3$. Cell 51 size was about 10 μm, small relative to the prior art specimens. Although it has been stated that the sintering process and pressing process are conducted in two iterations, three or more iterations may be effective, depending on the temperature and the pressure during the pressing process. Advantages include the ease of process afforded by multiple iterations over a single iteration.

Figure 4:
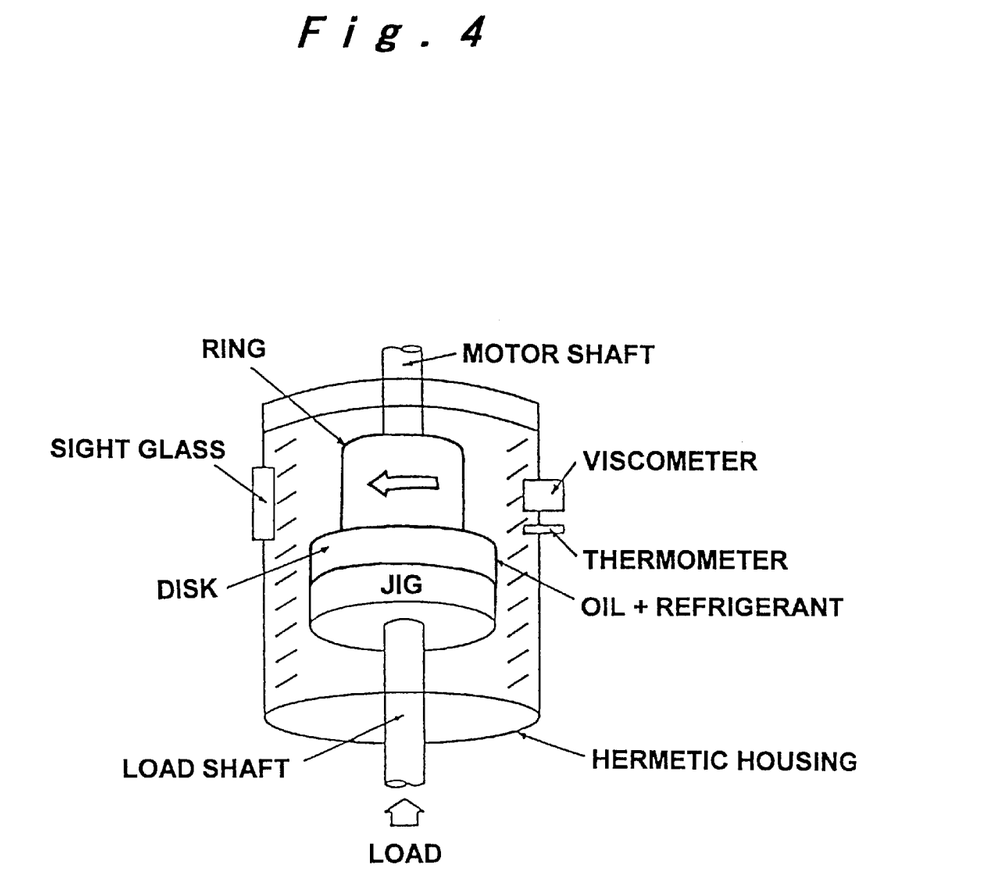
FIG. 4 is an oblique view showing wear test conditions for the test materials in FIG. 3.
Figure 5:
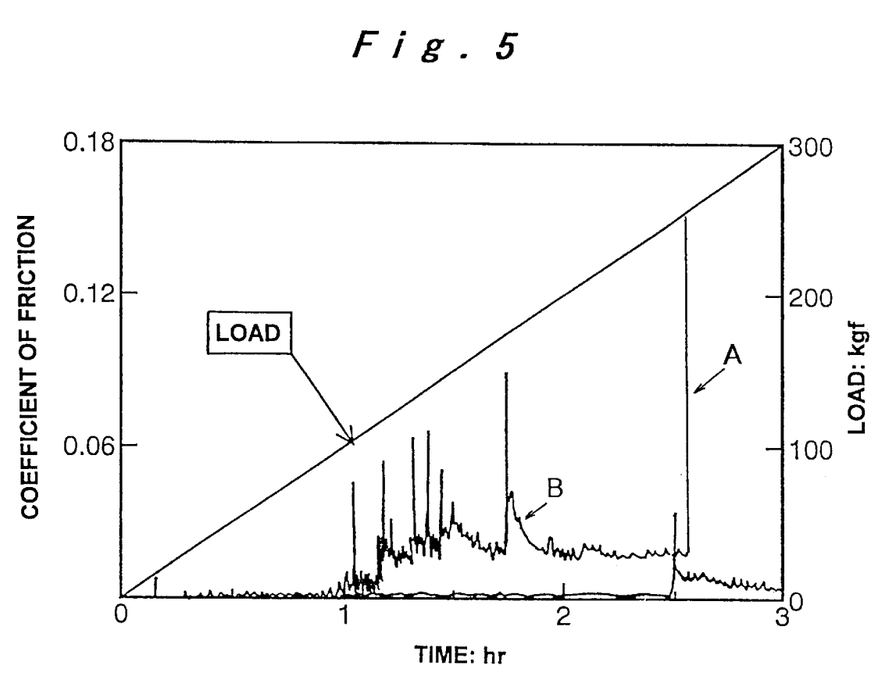
FIG. 5 is a graph giving results for changes in the coefficient of friction occurring with the passage of time in the wear tests.
Figure 6A:
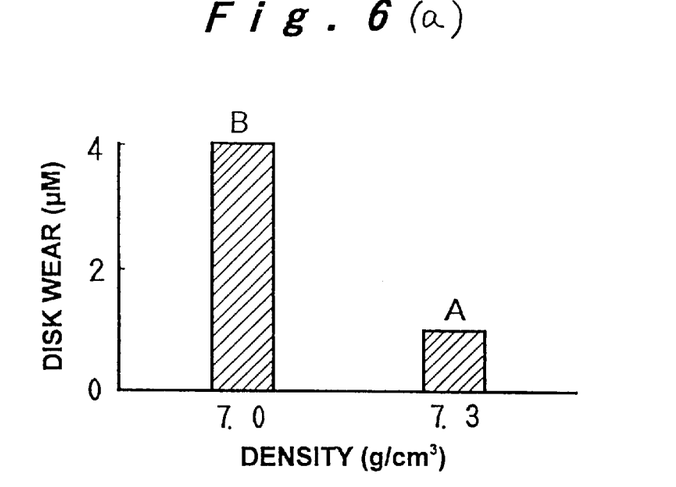
FIG. 6 shows graphs for other results from the wear tests, (a) showing the amounts of wear produced in the wear tests and (b) showing seizing load.
Figure 6B:
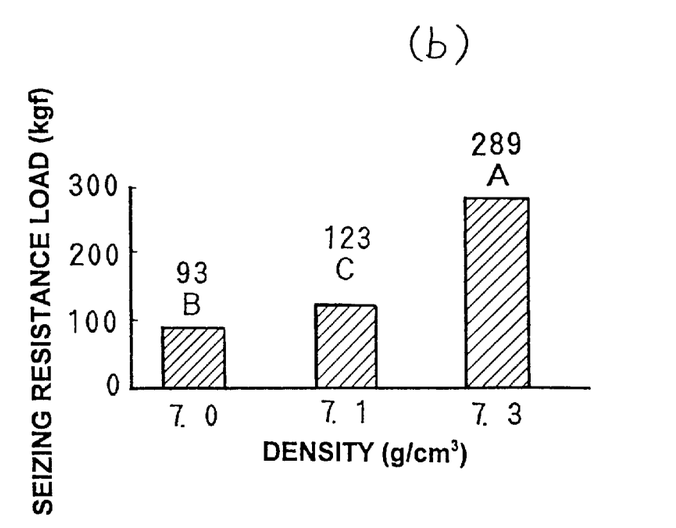

The inventors of the present invention fabricated rings from this test material and the prior art test material described above, and subjected these to wear tests under identical conditions using a high-pressure atmosphere wear tester like that depicted in FIG. 4, comparing the results for the two. Focusing on changes in the coefficient of friction over time, the prior art specimen (specific gravity 7.0 g/cm$^3$) exhibited an extreme rise in the coefficient of friction about the time that load reached 100 kgf, represented by line B in FIG. 5. In contrast, the specimen of this example (specific gravity 7.3 g/cm$^3$) exhibited only a slight rise in the coefficient of friction about the time that load reached 250 kgf. Referring to FIG. 6(a), in wear tests the prior art specimen (specific gravity 7.0 g/cm$^3$) exhibited disk (mated material) wear of 4 μm, as indicated by bar B, while that of the specimen of this example (specific gravity 7.3 g/cm$^3$) was only 1.2 μm, as indicated by bar A. Referring to FIG. 6(b), in seizing tests the prior art specimen (specific gravity 7.0 g/cm$^3$) was 93 kgf, as indicated by bar B, while the specimen of this example (specific gravity 7.3 g/cm$^3$) was much higher at 289 kgf. The wear resistance and seizing resistance of the specimen of this example are high, making it suitable for the slide bushings 44 and Oldham rings 43 used in hermetic, maintenance-free refrigeration compressors that employ chlorine-free hydrofluorocarbon refrigerants and hydrocarbon refrigerants, and that are susceptible to depletion of the oil film, thereby providing durability commensurate with the design life.

Where a chlorine-free refrigerant is used, the use of a lubricating oil that is miscible with the refrigerant results in the lubricating oil being carried along with the refrigerant circulating among the various parts in the hermetic housing 1, reaching the narrow portions of the mechanical sliding elements within the hermetic housing 1. Thus, the use of the elements of Embodiment 1 as the sliding elements is particularly effective in terms of improving wear resistance of the sliding elements. HFC hydrofluorocarbon refrigerants, which are chlorine-free, include R134a, R125, and R32. Lubricating oils miscible with such refrigerants include ester oils, ether oils, and alkyl benzene oil. In the case of the hydrocarbon refrigerants, which are HC refrigerants, relatively immiscible lubricating oils, such as naphthene mineral oils or carbonates, are used to achieve refrigerant reductions.

Seizing tests were also conducted on a comparative specimen having specific gravity (7.1 g/cm$^3$) lying between that of the prior art specimen and that of the specimen of this example. In this test, the seizing resistance load was 123 kgf, as indicated by bar C in FIG. 6(*b*), which would pose concern where the sliding element was intended for use under harsh sliding conditions. Thus, in preferred practice, sliding elements consisting of iron-base sinters have specific gravity of 7.3 g/cm$^3$ or above. The sliding element of Embodiment 1 is suitable for all sort of applications, for example, applications such as use in other components, use in open type refrigeration compressors that enable maintenance, and use in various machinery other than refrigeration compressors. Such applications would not necessarily require specific gravity of 7.3 g/cm$^3$ or above; it may be sufficient simply for the cells 51 to comprise closed cells 51 that do not communicate with other cells 51. The action of the cells 51 in terms of improving wear resistance and seizing resistance by dint of meeting this requirement is provided only by those closed cells 51 that have openings at the surface of the sliding element. The presence of closed cells within the interior of the sliding element has no relevance in terms of improving wear resistance. Accordingly, in order to improve wear resistance it is sufficient for closed cells 25 to be present on the slide face of the sliding element.

For example, a sliding element of prescribed shape is manufactured through casting of the prior art specimen described above. The surface layer is compressed by the mechanical pressures produced during casting, permitting density to be increased and the open cells to be transformed into closed cells, making it possible as a result to produce a slide face of prescribed density having closed cells present on the surface. Wear resistance can be improved through this sort of method as well. There is no particular need to use this surface layer formation method; various other methods have been examined and may be employed. The composition of the sliding element is not limited to that given above, and may be selected with reference to the intended application.

In harsh lubrication environments in which chlorine-free hydrofluorocarbon refrigerants and hydrocarbon refrigerants are used due to concerns regarding environmental safety, the ability to utilize the oil film sustaining capability of the closed cells in order to ameliorate the harsh lubrication environment in the compressor mechanism 2 housed within a hermetic housing 1 that constitutes a refrigerant channel is affected to a significant extend by the condition of the openings of the closed cells 51 on the slide face.

Figure 7:
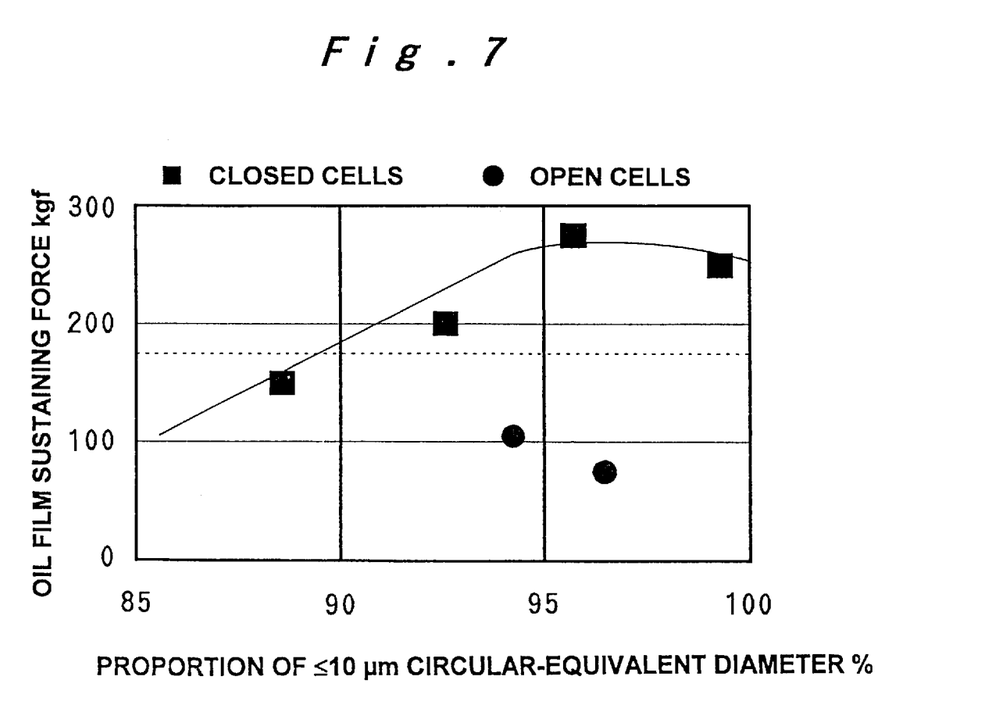
FIG. 7 is a graph comparing the relationship between proportion of closed cells having circular-equivalent diameter of 10 $\mu$m or less and oil film retaining power for the closed cell iron-base sliding element of the present invention with oil film retaining power for a conventional iron-base sliding element with open cells.

The relationship between oil film sustaining capability and cell 51 opening condition in this type of lubrication environment was examined in detail by the inventors of the present invention through extensive experimentation. The findings are given in FIG. 7. The black dots in FIG. 7 indicate the oil film sustaining capability of open cells in a chlorine-free HFC refrigerant environment. The black squares indicate the oil film sustaining capability of closed cells in a chlorine-free HFC refrigerant environment. The broken line indicates the chlorine-free HFC refrigerant oil film sustaining capability required to ensure resistance to seizing in the case of open cells in a chlorine-containing HCFC refrigerant environment. A correlation is apparent between oil film sustaining capability and resistance to seizing, with improved oil film sustaining capability observed to be associated with improved resistance to seizing. Referring to FIG. 7, good lubrication is assured where the closed cells 51 have cell opening area on the slide face equal to 5% or less, sliding element density is 7.3 g/cm$^3$ or above, and the proportion with circular-equivalent diameter of 10 $\mu$m or less (number of $\leqq$10 $\mu$m cells/total number of cells) is 85% or more. Under these conditions, resistance to seizing adequate to provide maintenance-free operation is afforded. Specifically, resistance to seizing superior to that with open cells in a chlorine-free HFC refrigerant environment is achieved. Where the proportion with circular-equivalent diameter of 10 $\mu$m or less (number of $\leqq$10 $\mu$m cells/total number of cells) is 90% or more, resistance to seizing exceeds that obtained with open cells in a chlorine-containing HCFC refrigerant environment. Ester oil, which is miscible with HFC refrigerants, was used as the lubricating oil.

Sintered iron sliding elements having closed cells 51 like those discussed above may be readily obtained through pressing and sintering twice in the manner described above. By employing hot forming, conducting the operation with the entire mold in a temperature-elevated state, high quality characterized by consistent pore conditions, density conditions, and metal bonding is achieved.

Figure 8:
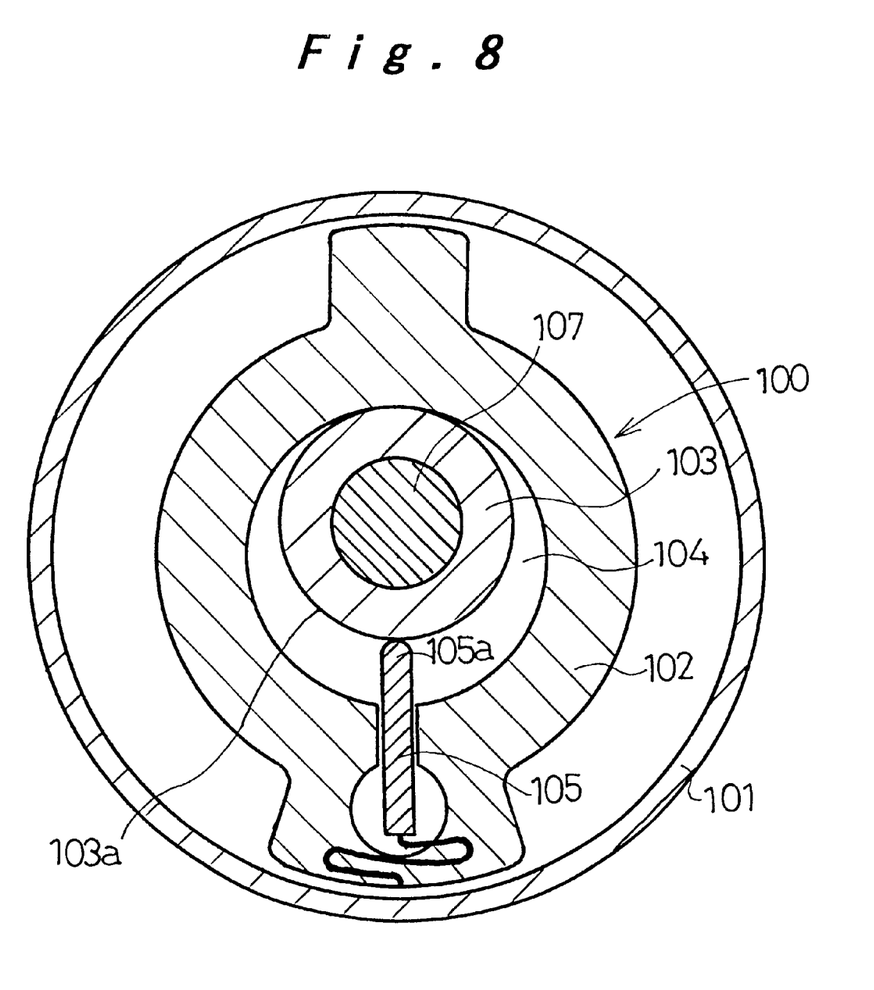
FIG. 8 is a lateral section of the rotary compressor of Embodiment 2 of the present invention.

Referring now to FIG. 8, Embodiment 2 is an example of the present invention embodied in a rotary refrigeration compressor. The principal structural elements of the refrigeration compressor of Embodiment 2 are of common type. A compressor mechanism 100 which, together with a drive mechanism, is provided within a hermetic housing 101 has a cylinder 102 that accommodates an eccentrically arranged piston 103; through rotation thereof by the drive mechanism through the agency of a motor shaft, this element moves in cooperation with a vane 105 whose distal end 105*a* slides against the outside wall 103*a* of the piston 103 and follows the motion thereof, causing the compression chamber 104 within the cylinder 102 to expand and contract so that the refrigerant is taken in during expansion of the compression chamber 104 and the taken-in refrigerant is compressed and expelled as the compression chamber 104 contracts, and is delivered to the refrigeration cycle.

The vane 105 which constitutes a sliding element of the refrigeration compressor is susceptible to wear in the portion thereof that comes into sliding contact with the outside wall of the piston 103, and durability is a problem. The problem is particularly severe where a chlorine-free hydrofluorocarbon refrigerant is used, creating harsh lubrication conditions which tend to cause oil film depletion. According to Embodiment 2, the vane 105 comprises a sliding element consisting of an iron-base sinter with density of 7.3 g/cm$^3$ or above similar to that discussed in Embodiment 1. Thus, the vane 105 is endowed with durability commensurate with designed service life, even under the harsh sliding conditions described above.

Depending on sliding conditions, the sliding element which makes up the vane 105, as well as the sliding elements which constitute other components, can be ones meeting the various conditions indicated in Embodiment 1.

According to the sliding element which pertains to the present invention, closed cells provided to the slide face retain lubricating oil that has penetrated therein, continuously delivering this lubricating oil to the sliding surface in localized fashion to maintain an oil film. Resistance to seizing is enhanced thereby, and the sintered iron is stronger than aluminum alloy powder sinters. Accordingly, it is suitable for use in refrigeration compressor slide bushings and Oldham rings. Slide bushings and Oldham rings are slidably mated with aluminum-base orbiting scrolls, but since these two elements are fabricated from different metals, they do not consist of like metal, and thus the sticking associated with the use of like metal is eliminated.

Provided that the proportion of closed cells with circular-equivalent diameter of 10 $\mu$m or less equals 85% or more and the cell opening area on the slide face equals 5% or less, adequate lubricating qualities are assured even under the harshest sliding conditions, i.e., a combination of a chlorine-free refrigerant and an ester oil, thereby providing resistance to seizing adequate to ensure maintenance-free operation. Specifically, resistance to seizing superior to that with open cells in a chlorine-containing HFC refrigerant environment is achieved. Where the proportion with circular-equivalent diameter of 10 $\mu$m or less is 90% or more, resistance to seizing exceeds that obtained with open cells in a chlorine-containing HCFC refrigerant environment.

The sliding element is produced conducting two iterations of pressing and subsequent sintering, thus affording a high-quality material having consistent cell conditions. In preferred practice, density is 7.3 g/cm³ or higher.

According to the refrigeration compressors of the present invention, where slide bushings, Oldham rings, and vanes, which tend to experience generic or localized durability problems, comprise sliding elements of the sort described above, these elements will exhibit the same advantages as the sliding elements described earlier, allowing the service life of the refrigeration compressor to be extended. The improved lubricating qualities and resistance to seizing give durability adequate to ensure maintenance-free operation, even where the components are small and thus lacking in strength, where the mated sliding member is an aluminum-base orbiting scroll, where the refrigerant cannot be expected to provide any lubrication due to the use of a chlorine-free refrigerant, or where the element is used under conditions that give rise to chemical wear, such as thermal decomposition of ester oils due to the elevated temperature of the iron-base sliding element. The reduced coefficient of friction reduces sliding loss, improving compressor performance.

Since equivalent performance can be achieved with reduced input, energy savings may be realized as well.

What is claimed is:

1. A sliding element comprising an iron-base sinter having closed cells, wherein a proportion of said closed cells having a circular-equivalent diameter of 10 $\mu$m or less to a total number of cells equals 85% or more, and a cell opening area on a slide face equals 5% or less of said total number of cells.

2. A sliding element according to claim 1, wherein said iron-base sinter is produced by multiple iterations of pressing followed by sintering.

3. A sliding element according to claim 1, having a density of 7.3 g/cm³ or higher.

4. A refrigeration compressor, comprising:
   a compressor mechanism;
   a drive mechanism for driving said compressor mechanism;
   a crankshaft for transmitting a rotation, of said drive mechanism, to an orbiting scroll of said compressor mechanism; and
   a slide bushing provided between said crankshaft and said orbiting scroll having an iron-base sinter sliding element with closed cells wherein a proportion of said closed cells having a circular-equivalent diameter of 10 $\mu$m or less to a total number of cells equals 85% or more, and a cell opening area on a slide surface equals 5% or less of said total number of cells.

5. A refrigeration compressor according to claim 6, wherein said iron-base sinter sliding element is produced by multiple iterations of pressing followed by sintering.

6. A refrigeration compressor according to claim 5, wherein said orbiting scroll is formed of an aluminum-base material.

7. A refrigeration compressor according to claim 4, wherein said sliding element has a density of 7.3 g/cm³ or higher.

8. A refrigeration compressor according to claim 4, further comprising a chlorine-free hydrofluorocarbon or hydrogen refrigerant.

9. A refrigeration compressor according to claim 8, further comprising an ester oil lubricant.

10. A refrigeration compressor, comprising:
    a compressor mechanism;
    an orbiting scroll and a stationary scroll, positioned so as to form a compression chamber;
    a drive mechanism for driving said compressor mechanism;
    a crankshaft for transmitting a rotation, of said drive mechanism, to said orbiting scroll of said compressor mechanism; and
    an Oldham ring, for supporting said orbiting scroll so as to cause said orbiting scroll to undergo orbital motion without rotating with respect to said stationary scroll, having an iron-base sinter sliding element with closed cells on a slide face, wherein a proportion of said closed cells having circular-equivalent diameter of 10 $\mu$m or less to a total number of cells equals 85% or more, and a cell opening area on said slide face equals 5% or less of said total number of cells.

11. A refrigeration compressor according to claim 10, wherein said iron-base sinter sliding element is produced by multiple iterations of pressing followed by sintering.

12. A refrigeration compressor according to claim 11, wherein said orbiting scroll is formed of an aluminum-base material.

13. A refrigeration compressor according to claim 11, further comprising a chlorine-free hydrofluorocarbons refrigerant.

14. A refrigeration compressor according to claim 10, wherein said sliding element has a density of 7.3 g/cm³ or higher.

15. A refrigeration compressor according to claim 10, further comprising a chlorine-free hydrofluorocarbon refrigerant.

16. A refrigeration compressor according to claim 15, further comprising an ester oil lubricant.

17. A refrigeration compressor comprising:
- a piston that rotates eccentrically in sliding contact with an inside face of a cylinder; and
- a vane, provided to said cylinder and arranged in sliding contact with said piston engaging in follower motion therewith, having an iron-base sinter sliding element with closed cells on a slide face, wherein a proportion of said closed cells having circular-equivalent diameter of 10 $\mu$m or less to a total number of cells equals 85% or more, and a cell opening area on said slide face equals 5% or less of said total number of cells.

18. A refrigeration compressor according to claim 17, wherein said iron-base sinter sliding element is produced by multiple iterations of pressing followed by sintering.

19. A refrigeration compressor according to claim 18, further comprising a chlorine-free hydrofluorocarbon or hydrocarbon refrigerant.

20. A refrigeration compressor according to claim 17, wherein said sliding element has a density of 7.3 g/cm$^3$ or higher.

21. A refrigeration compressor according to claim 17, further comprising a chlorine-free hydrofluorocarbon or hydrocarbon refrigerant.

22. A refrigeration compressor according to claim 21, further comprising an ester oil lubricant.

\* \* \* \* \*

UNITED STATES PATENT AND TRADEMARK OFFICE
CERTIFICATE OF CORRECTION

PATENT NO. : 6,299,424 B1
DATED : October 9, 2001
INVENTOR(S) : Yoshiyuki Futagami et al.

It is certified that error appears in the above-identified patent and that said Letters Patent is hereby corrected as shown below:

Title page,
Delete Item [22] and substitute therefore
-- [22] PCT Filed : September 17, 1998 --
Insert the following items: -- [86] PCT No. : PCT/JP98/04198
§ 371 Date : April 11, 2000
§ 102(e) Date : April 11, 2000
[87] PCT Pub. No. : WO99/14511
PCT Pub. Date : March 25, 1999 --

Signed and Sealed this

Twenty-third Day of April, 2002

Attest:

JAMES E. ROGAN
Attesting Officer          Director of the United States Patent and Trademark Office